(12) United States Patent
Mason et al.

(10) Patent No.: US 8,356,945 B2
(45) Date of Patent: Jan. 22, 2013

(54) RAILWAY CAR ROLLER BEARING

(75) Inventors: Michael Mason, Richmond, VA (US); Paul A. Hubbard, Petersburg, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 543 days.

(21) Appl. No.: 12/592,334

(22) Filed: Nov. 24, 2009

(65) Prior Publication Data
US 2011/0123142 A1 May 26, 2011

(51) Int. Cl.
*F16C 33/48* (2006.01)
*F16C 43/04* (2006.01)
(52) U.S. Cl. .................................... 384/572; 384/560
(58) Field of Classification Search .............. 384/560, 384/571–580, 523–534
See application file for complete search history.

(56) References Cited

U.S. PATENT DOCUMENTS

| | | | | |
|---|---|---|---|---|
| 3,989,326 A * | 11/1976 | Hormann et al. | ............. | 384/572 |
| 4,435,024 A * | 3/1984 | Tagawa et al. | ................ | 384/576 |
| 4,728,204 A * | 3/1988 | Colanzi et al. | ................ | 384/572 |
| 4,812,058 A * | 3/1989 | Hofmann et al. | ............. | 384/563 |
| 4,824,265 A * | 4/1989 | Hofmann et al. | ............. | 384/560 |
| 4,907,898 A * | 3/1990 | Dickinson | ...................... | 384/564 |
| 2007/0280574 A1 * | 12/2007 | Tsujimoto | ..................... | 384/590 |

\* cited by examiner

*Primary Examiner* — Thomas R Hannon
*Assistant Examiner* — Alan Waits
(74) *Attorney, Agent, or Firm* — Edward J. Brosius

(57) ABSTRACT

A bearing assembly is provided having a roller bearing a cone forming an inner race fitted around the journal portion of an axle. A cup forms an outer raceway that combines with the inner raceway to receive roller elements. A backing ring is centered to the shaft fillet. Tapered roller elements are located between and contact the inner and outer raceways. A cage is comprised of an inner ring, and outer ring, and a plurality of pocket bars extend between the inner and outer rings. The pocket bars of the cage include a protrusion that is received in a groove in the cone.

6 Claims, 2 Drawing Sheets

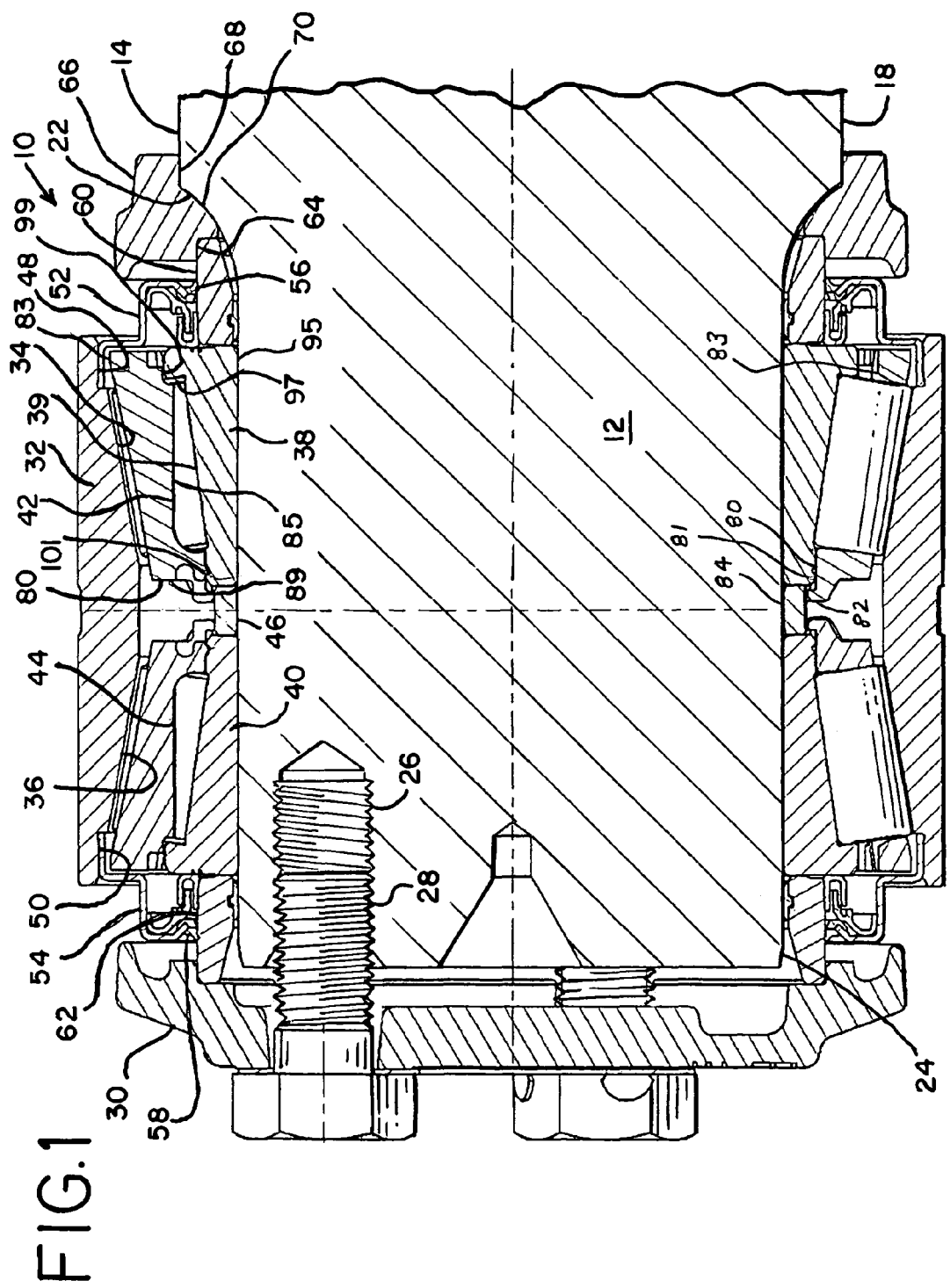

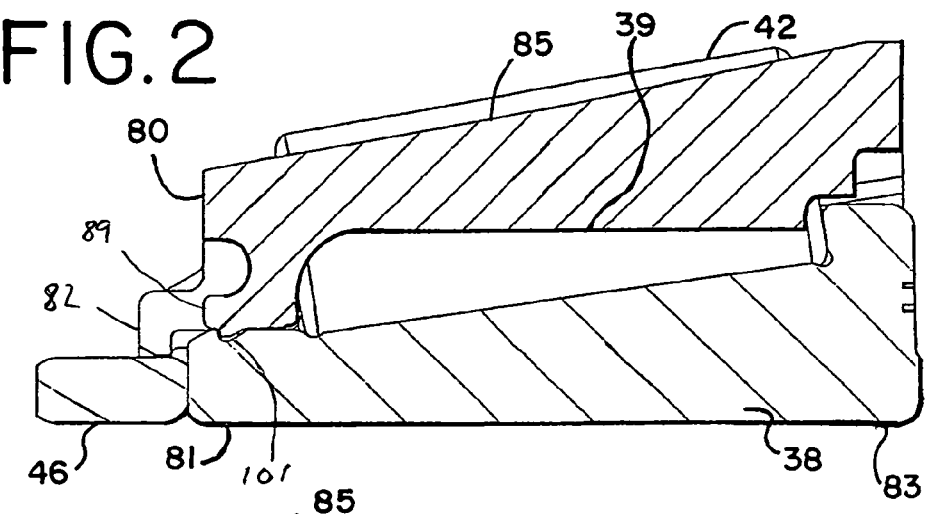
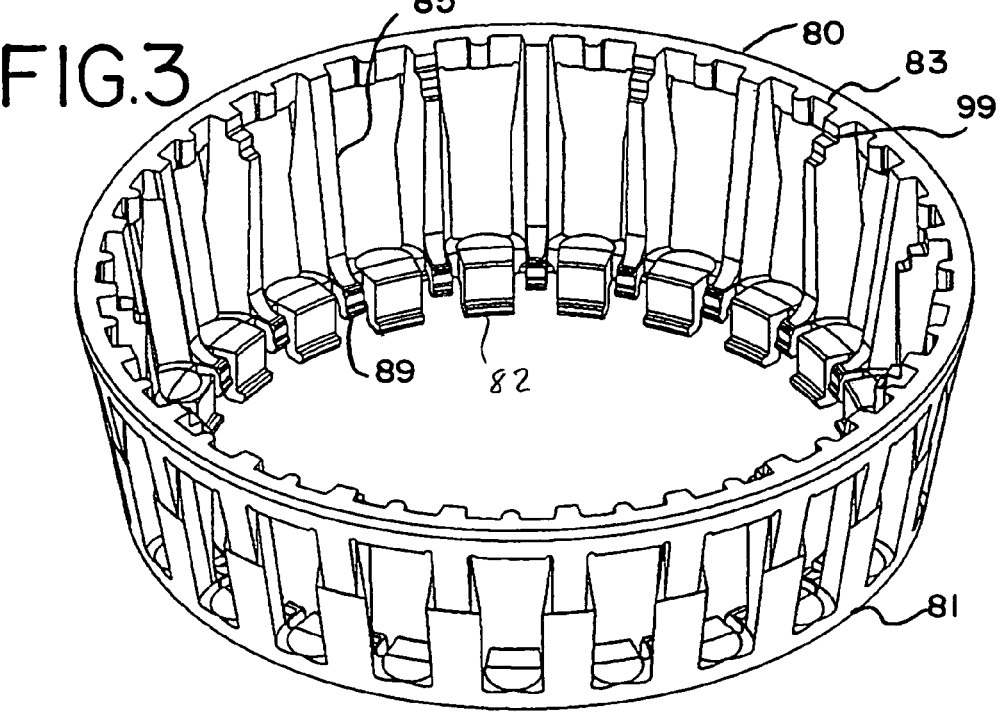
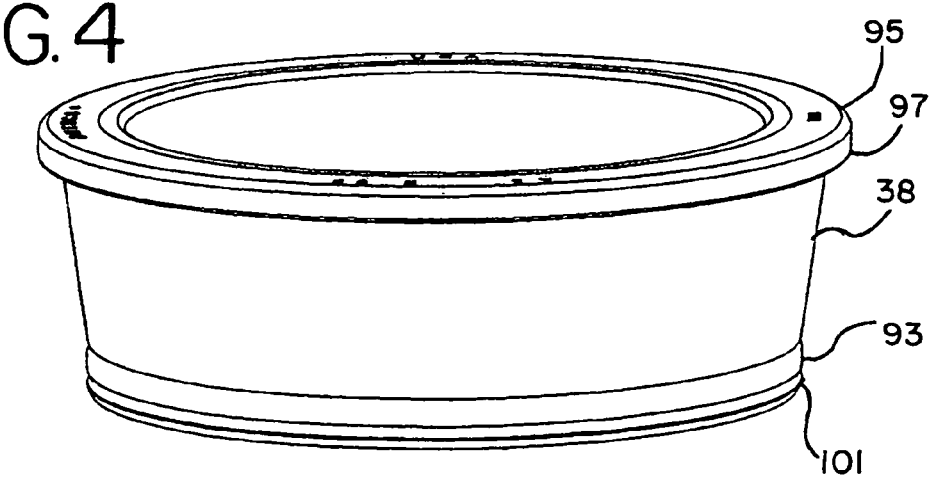

RAILWAY CAR ROLLER BEARING

BACKGROUND OF THE INVENTION

This invention relates to tapered roller bearings and more particularly to an improved cage and cone combination for such tapered roller bearings for use in a railcar.

Roller bearing assemblies incorporate two rows of tapered roller bearings preassembled into a self-contained, pre-lubricated package for assembly onto journals at the ends of axles or shafts. Such bearing assemblies are used as rail car bearings assembled onto journals at the ends of the car axles. Bearings of this type typically employ two rows of tapered roller bearings fitted one into each end of a common bearing cup with their respective bearing cones having an inner diameter dimensioned to provide an interference fit with the shaft journal and a cylindrical sleeve or spacer positioned between the cones providing accurate spacing on the journal. A cage keeps the tapered roller bearings in each row spaced from each other and properly aligned. Seals mounted within each end of the bearing cup provide sealing contact with wear rings bearing against the outer ends of the respective bearing cones at each end of the assembly.

In a typical rail car installation, the axle journal is machined with a fillet at the inboard end, and a backing ring having a surface complementary to the contour of the fillet and an abutment surface for engaging the inboard end of the inner wear ring accurately position the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide an interference fit with the journal over at least a portion of their length so that the entire assembly is pressed as a unit onto the end of the journal shaft.

SUMMARY OF THE INVENTION

The tapered roller bearing assembly includes an inner race formed in a cone fitted around the journal portion of the axle or shaft. The inner race includes an outwardly directed raceway. A cup having an outer race with an inwardly directed raceway. Roller elements are located between the inner and outer raceways. A cage is a unitary structure that keeps the roller elements spaced from each other and aligned. The cage is preferably comprised of a nylon or a polymer fiber filler material, but can be formed of steel.

A backing ring has a contoured surface complementary to and engaging the contoured surface of a fillet formed on the shaft. The fillet leads from the journal to the shoulder of the shaft. The contoured surfaces cooperate to fix the backing ring against axial movement along the shaft. An annular wear ring is interposed between and engages the inner race and the backing ring. The cage includes an inner ring and an outer ring, with pocket bars extending there between. At least one and preferably all pocket bars include a snap protruding or a groove formed in an inwardly facing portion. Each cone includes an outer edge portion and an inner edge portion with a groove or a snap adapted to complementarily receive the snap or groove in the cage pocket bars.

BRIEF DESCRIPTION OF THE DRAWINGS

In the drawings,

FIG. 1 is a sectional view of a shaft journal having mounted thereon a tapered roller bearing assembly in accordance with an embodiment of the present invention;

FIG. 2 is a partial detail cross section of a tapered roller bearing in accordance with an embodiment of the present invention;

FIG. 3 is a perspective view of a cage for a tapered roller bearing assembly in accordance with an embodiment of the present invention, and FIG. 4 is a perspective view of a cone for a tapered roller bearing assembly in accordance with an embodiment of the present invention.

DESCRIPTION OF THE PREFERRED EMBODIMENTS

Referring now to FIG. 1 of the drawings, a tapered roller bearing assembly indicated generally by the reference numeral 10 on FIG. 1 is shown mounted on a journal 12 on the free, cantilevered end of a shaft or axle 14, typically a rail car axle. Journal 12 is machined to very close tolerances and terminates at its inner end in a contoured fillet 22 leading to a cylindrical shoulder 18 of axle 14. At the free end of the axle, journal portion 12 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully herein below.

The tapered roller bearing assembly 10 is preassembled before being mounted and clamped on journal 12 by cap 30. The tapered roller bearing assembly includes a unitary bearing cup or outer raceway 32 having a pair of inwardly facing raceways 34, 36 formed one adjacent each end thereof which cooperate with a pair of bearing cones 38, 40, respectively, to support the two rows of tapered rollers 42, 44, respectively, there between. Cone 38 forms outwardly facing raceway 39. Cone 40 also forms an outwardly facing raceway. A center spacer 46 is positioned between cones 38, 40 to maintain the cones in accurately spaced relation relative to one another.

The bearing cup 32 is provided with cylindrical counterbores 48, 50 at its opposite ends outboard of the raceways 34, 36, and a pair of seal assemblies 52, 54 are pressed one into each of the cylindrical counterbores 48, 50. The seals 52, 54 include resilient sealing elements 56, 58, respectively, which rub upon and form a seal with a pair of seal wear ring sleeves 60, 62, respectively, having their inwardly directed ends in engagement with the outwardly directed ends of bearing cones 38, 40, respectively. The other end of wear ring sleeve 60 is received in a cylindrical counterbore 64 in the axially outwardly directed end of an annular backing ring 66 which, in turn, has a counterbore 68 at its other end which is dimensioned to be received in interference and non-interference relation on the cylindrical shoulder 18 of shaft 14. The counterbore 64 and the outer diameter of wear ring sleeve 60 are also dimensioned to provide an interference fit so that the wear ring is pressed into the backing ring 66 which is accurately machined to provide a contoured inner surface 70 complementary to and engaging the contour of fillet 22 when the bearing is mounted on the shaft. The outwardly directed end of sleeve 62 bears against the retaining cap 30.

Cage 80 is typically a unitary structure comprised of a resin material such as a polymer or nylon resin. Cage 80 usually comprises a fiber filler, usually of glass or carbon fiber, or else of steel. Cage 80 could also be comprised of steel.

Cage 80 is seen to be a generally cylindrical structure. Cage 80 is comprised of a generally circular inner ring 81 and a generally circular larger diameter outer ring 83. A plurality of pocket bars 85 extend from inner ring 81 to outer ring 83 to provide structural support between inner ring 81 and outer ring 83. Cage 80 also includes leg section 82 which acts to hold spacer 84 in place.

Each pocket bar 85 is seen to include a snap 89 protruding radially inwardly from the radially inner portion of inner ring 81. Alternately, a groove could be provided in the radially inner portion of pocket bar 85. One or more pocket bars 85 may include a snap 89, but ideally each pocket bar includes a snap 89.

Each cone 38 is comprised of a generally cylindrical structure having a generally circular inner edge portion 93 and a generally circular outer edge portion 95. Outer edge portion 95 includes a radially outwardly protruding lip 97 that is received in a complementary edge 99 formed in an inwardly facing pocket bar 85 of cage 80.

Cone 38 also includes a groove 101 formed in a radially outwardly facing edge of inner edge portion 93. Snap 89 of pocket bar 85 is received in complementary groove 101 in cone 38 inner edge portion 93.

Alternately, cone 38 could include a protruding snap received in a complementary groove in pocket bar 85.

The improved arrangement of cone 38 and cage 80 results in an easier to assemble roller bearing assembly.

Tapered rollers 42 are held in place by the interaction between the snap 89 in pocket bar 85 of cage 80 and the receiving groove 101 of cone 38. This assembly can be shipped as is ready for placement over the journal 12 of a railway car axle 14.

Further, the interaction between snap 89 of cage 80 and groove 107 of cone 38, with the receipt of outwardly protruding lip 97 of cone 38 in complementary edge 99 or pocket bar 85 of cage 80 acts to keep tapered rollers 42 aligned while in service providing improved wear characteristics.

Typical dimension for snap 89 on pocket bar 85 are an outward radial dimension from 0.25 to 1.25 mm and a width of from 0.5 to 3 mm. The dimensions of groove 101 in cone 38 inner edge portion would be of a complementary nature to accommodate snap 89.

What is claimed is:

1. A tapered roller bearing assembly comprising,
a cone having an inner race with an outwardly directed raceway thereon,
a cup having an outer race having an inwardly directed raceway thereon,
a spacer located adjacent the cone,
and tapered roller elements located between and contacting the outwardly directed raceway and the inwardly directed raceway,
and a cage to provide spacing and alignment for the tapered roller elements,
the cage comprising an inner ring and an outer ring, and a plurality of pocket bars extending between the inner ring and the outer ring,
wherein at least one of the pocket bars includes a snap protruding therefrom,
the cage also comprising a plurality of leg sections which support the spacer,
and the cone includes an outer edge portion and an inner edge portion, wherein the inner edge portion includes a groove adapted to receive the snap on the cage pocket bar.

2. The tapered roller bearing assembly of claim 1 wherein the snap protrudes from each pocket bar.

3. The tapered roller bearing assembly of claim 1, wherein each pocket bar has a base section attached to the inner ring, and
the snap protrudes radially inwardly from the base section of each pocket bar.

4. The tapered roller bearing assembly of claim 1, wherein the cone outer edge portion and the inner edge portion joined by a center portion, and
wherein the groove is located on a radially outwardly facing portion of the inner edge portion of the cone.

5. The tapered roller bearing assembly of claim 1, wherein the cage outer ring includes a radially inwardly facing cutout section, and
the cone outer edge portion includes a radially outwardly projecting portion received in the radially inwardly facing cutout section of the cage.

6. The tapered roller bearing assembly of claim 1, wherein the cage is a unitary structure comprised of a resin material with a filler of glass fibers.

\* \* \* \* \*